(12) United States Patent
Reichert et al.

(10) Patent No.: US 6,369,145 B1
(45) Date of Patent: Apr. 9, 2002

(54) LOW GLOSS POLYESTER COATING POWDER COMPOSITIONS

(75) Inventors: Veronica M. Reichert; Andrea M. Anderson, both of Reading; Jeno Muthiah, Wernesville, all of PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 09/433,447

(22) Filed: Nov. 4, 1999

(51) Int. Cl.⁷ .............................. C08J 5/10; C08K 5/09; C08K 5/10; C08L 31/08
(52) U.S. Cl. .................. 524/301; 524/315; 524/316; 524/317; 524/318; 524/322
(58) Field of Search ................... 524/317, 318, 524/322, 315, 316, 301

(56) References Cited

U.S. PATENT DOCUMENTS

| | | | |
|---|---|---|---|
| 4,379,895 A | 4/1983 | Frerking, Jr. et al. | 525/437 |
| 5,262,491 A | * 11/1993 | Jain et al. | 525/396 |
| 5,321,100 A | 6/1994 | Belder et al. | 525/438 |
| 5,326,832 A | 7/1994 | Belder et al. | 525/483 |
| 5,684,067 A | 11/1997 | Muthiah et al. | 523/453 |

* cited by examiner

Primary Examiner—James J. Seidleck
Assistant Examiner—U. K. Rajguru

(57) ABSTRACT

Low gloss in a coating derived from a polyester/triglycidyl isocyanurate coating powder is achieved by including in the coating powder ethylene/acrylic acid copolymer plus a zinc salt of a fatty acid and/or a zinc salt of a beta diketone.

5 Claims, No Drawings

LOW GLOSS POLYESTER COATING POWDER COMPOSITIONS

The present invention is directed to polyester coating powder compositions, particularly those polyester powder coating compositions cured with triglycidyl isocyanurate (TGIC), formulated to have low gloss.

BACKGROUND OF THE INVENTION

A well-known type of coating powder is based on acid-functional polyester resin and TGIC as a curative. Such a coating powder is found, for example, in U.S. Pat. Nos. 5,321,100, 5,326,832, and 4,379,895, the teachings of each of which are incorporated herein by reference. Polyester coating powders are particularly advantageous in some outdoor applications, such as coating lawn furniture or window frames, because polyester coatings exhibit good UV-stability.

Coatings formed from polyester coating powder compositions tend to have relatively high gloss. For reasons of aesthetic preference, it is often desirable to have coating powders which provide low gloss. U.S. Pat. No. 5,684,067, the teachings of which are incorporated herein by reference, teaches a low gloss polyester coating powder which is achieved through the addition of 2-mercapto benzothiazole or a salt thereof plus a polyolefin wax plus an ethylene acrylic acid copolymer. While such compositions have proven successful in achieving low gloss, 2-mercapto benzothiazole has a strong odor which persists during curing of the coating powder, making it unsuitable to many customers. Also, polyolefin wax may not be incorporated fully into a cured coating and tends to come to the surface where it is easily abraded away resulting in coatings which soon appear marred.

SUMMARY OF THE INVENTION

In accordance with the invention, in a polyester/TGIC coating powder reduced gloss is achieved by incorporation of a copolymer of ethylene and acrylic and/or methacrylic acid, plus a zinc salt of either an organic carboxylic acid or a beta diketone at a level so as to provide zinc at a level of between about 0.05 and about 0.30 phr.

DETAILED DESCRIPTION OF CERTAIN PREFERRED EMBODIMENTS

Herein, unless otherwise noted, the resin of the coating powder is considered to be the polyester(s) and TGIC at 100 parts by weight total. Levels of other components are given as parts per hundred resin, by weight (phr). Percentages, unless otherwise noted, are weight percentages.

In coating powders of this type, the polyester is typically present at between about 90 and about 95 wt % of the total of polyester plus TGIC; and TGIC is present at between about 5 and about 10 wt % of the total of polyester plus TGIC.

Polyesters of the type generally used in coating powders are useful in the practice of the present invention. Molecular weights (number average) ($M_n$) of the polyesters generally range from about 2000 and about 7000, preferably between about 3000 and about 3500. Acid numbers typically range between about 30 and between about 60, preferably between about 30 and about 35. Glass transition temperatures are typically in the range of between about 40° C. and about 80° C. To be curable by TGIC, the polyesters have acid functionalities of at least 2, up to about 3.5, but preferably in the range of between about 2.1 and about 2.5.

Polyesters are formed in conventional manner from carboxylic acids (or their anhydrides) having acid functionalities of 2 or greater and polyols having hydroxyl functionality of 2 or greater. Examples of suitable multi-functional carboxylic acids include benzene-1,2,4-tricarboxylic acid, phthalic acid, tetrahydraphthalic acid, hexahydrophthalic acid, endobicyclo-2,2,1-5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, tetrachlorophthalic acid, adipic acid, sebacic acid, and like carboxylic acids, Examples of suitable multi-functional alcohols include glycerin, trimethylolpropane, trimethylolethane, trishydroxyethylisocyanurate, pentaerythritol, ethylene glycol, diethylene glycol, propylene glycol, trimethylene glycol, 1,3-, 1,2- and 1,4-butanediols, heptanediol, hexanediol, octanediol, 2,2-'bis (4-cyclohexanol) propane, neopentyl glycol, 2,2,3-trimethylpentane-1,3-diol, 1,4-dimethylolcyclohexane, 2,2,4-trimethylpentane diol, etc. To obtain carboxyl-functional polyesters of desired molecular weight, the monomer mixture used to form the polyester has an appropriate excess of carboxyl functionality to hydroxyl functionality.

The ethylene/acrylic acid copolymer (EEA) used in the present invention as one of the gloss reducing agents is formed of between about 80 and about 95 wt % ethylene monomer and between about 5 and about 20 wt % acrylic acid and/or methacrylic acid, preferably acrylic acid. The melt index ($MI_2$) as measured by ASTM D-1238 is between about 10 and about 30, preferably in the range of about 20. A suitable commercial EAA copolymer is sold as Corvel® DG-9003, acrylic acid content 10 wt %.

In accordance with the invention, it is found that zinc salts of fatty acids and/or zinc salts of ($\alpha,\gamma$-diones reduce gloss in coatings produced from polyester/TGIC coating powders.

Fatty acids useful in the invention have between 8 and 25 carbon atoms. Examples of fatty acid salts useful in the invention include, but are not limited to zinc neodecanate (the currently preferred zinc salt of a fatty acid), zinc stearate, zinc pelargonate, zinc undecanoate, zinc laurate, zinc tridecanoate, zinc myristate, zinc pentadecanoate, zinc palmitate, zinc margarate, zinc nonadecanoate, zinc arachidate, zinc heneicosanoate, zinc behenate, zinc tricosanoate, zinc lignocerate (zinc carnaubate), and zinc pentacosanic. Suitable beta diketones have between 5 and 20 carbon atoms. Currently preferred from the standpoint of availability is zinc acetylacetonate (ZnAcAc).

Optionally, the coating powder may include a cure catalyst, such as methyl triphenyl phosphonium bromide (MTPB), tetra n-butyl phosphonium bromide (TPB), di-butyltin oxide, and tetrabutyl titanate. Heat stabilizers are beneficial, particularly in white compositions, to prevent yellowing.

The coating composition may be filled or unfilled. Filling is possible up to about 50 to 60 phr with fillers and pigments such as carbon black, titanium dioxide, silica, etc.

The thermosetting resin coating particulates are produced in the usual manner. The components are blended, and then are melt-compounded with heating above the melting point of the resin for a short time, e.g., 30–90 sec., so that no significant curing occurs. The molten compound is extruded, and after extrusion, the composition is rapidly cooled. The composition is then ground and, as necessary, the particulates sorted according to size. For electrostatic coating application, the particulates are generally in the 5–100 micron size range with a major portion generally being in the 20–40 micron size range. Larger particulates are useful for fluidized bed coating operations.

The invention will now be described in greater detail by way of specific examples.

A base formulation was prepared containing the following components:

EXAMPLES 1-20

| Components | PHR |
|---|---|
| Morkote ®, carboxylic acid terminated polyester | 65 |
| Grilesta ®, carboxylic acid terminated polyester with MTPB catalyst | 28 |
| TGIC | 7 |
| Resiflow ® flow control agent | 1.4 |
| Benzoin, degassing agent | 0.8 |
| Titanium dioxide, level depending upon color considerations | 30–50 |
| Iron Oxide, level depending upon color considerations | 0–2 |

To the base formula was added components as set forth in the table below. Cure schedules were at 400° F. (204° C. for 10 minutes); and under these conditions Gel times (sec.) and 60° Gloss results are given.

| Sample | DG-9003 (EAA) | MB ZnNeo* | ZnAcAC | ZnStr** | Gloss 60° | Gel time |
|---|---|---|---|---|---|---|
| Control | 8.0 | | | | 55 | 170 sec. |
| | | Olive grey formulations | | | | |
| 1 | 8.0 | 4.0 | | | 48 | 200 |
| 2 | 8.0 | 5.5 | | | 33 | 184 |
| 3 | 8.0 | 8.0 | | | 22 | 138 |
| 4 | 8.0 | 10 | | | 21 | 130 |
| 5 | 8.0 | 15 | | | 25 | 85 |
| 6 | 8.0 | 20 | | | 28 | 68 |
| | | White formulations | | | | |
| 7 | 6.0 | 10 | | | 25 | 99 |
| 8 | 8.0 | 10 | | | 21 | 130 |
| 9 | 12 | 10 | | | 42 | 206 |
| 10 | 8.0 | 8.0 | | | 22 | 138 |
| 11 | 10.5 | 8.0 | | | 48 | 208 |
| 12 (comp.) | 0.0 | 5.5 | | | 89 | 89 |
| 13 | 8.0 | 5.5 | | | 33 | 184 |
| 14 | 9.0 | 5.5 | | | 31 | 175 |
| 15 | 8.0 | | 0.5 | | 26 | 103 |
| 16 | 8.0 | | 1.0 | | 28 | 65 |
| 17 | 8.0 | | 2.0 | | 48 | 37 |
| 18 | 8.0 | | 4.0 | | 12 (texture) | 28 |
| 19 | 8.0 | | | 2.0 | 45 | 59 |
| 20 | 8.0 | | | 1.0 | 36 | 107 |

*MBZinc Neo = zinc neodeconate at 10% active ingredients in Nyad ® liquid extender
**Zinc Stearate Gloss levels also vary depending upon cure conditions. Higher cure temperatures and/or longer cure times tend to produce coatings of lower gloss.

What is claimed is:

1. In a powder coating composition comprising a polyester resin and triglycidyl isocyanurate, the improvement wherein said coating powder composition further consists essentially of between about 2 and about 10 parts per hundred resin by weight of a copolymer of ethylene and acrylic acid, said copolymer consisting essentially of between about 80 and about 95 wt % ethylene and between about 5 and 20 wt % acrylic acid; plus a zinc salt selected from the group consisting of zinc salts of fatty acids having between 8 and 25 carbon atoms, zinc salts of α,γ-diones having between 5 and 20 carbon atoms, and mixtures thereof, with the proviso that said zinc salt is not a zinc salt of 2-mercapto benzothiazole; said zinc salt providing zinc at between about 0.05 and about 0.30 phr, whereby reduced gloss is achieved.

2. The coating powder composition according to claim 1 wherein said zinc salt comprises zinc neodecanate.

3. The coating powder composition according to claim 1 wherein said zinc salt comprises zinc stearate.

4. The coating powder composition according to claim 1 wherein said zinc salt comprises zinc acetylacetonate.

5. The coating powder composition according to claim 1 wherein said ethylene/acrylic acid copolymer has a melt index ($MI_2$) as measured by ASTM D-1238 of between about 10 and about 30.

* * * * *